H. J. BRUNNIER.
DOCK STRUCTURE.
APPLICATION FILED SEPT. 18, 1913.
1,089,745.
Patented Mar. 10, 1914.
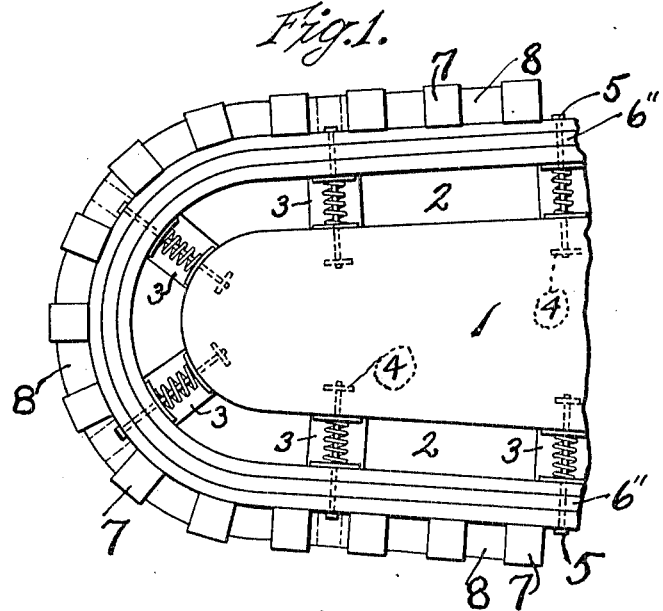
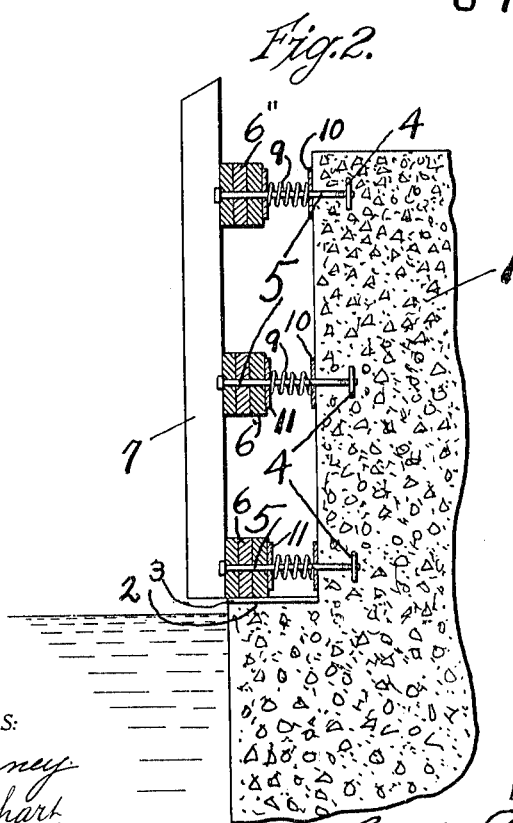
WITNESSES:
F. A. Limney
A. H. Kephart
INVENTOR.
H. J. BRUNNIER.
BY
Carlos P. Griffin
ATTORNEY.

UNITED STATES PATENT OFFICE.

HENRY J. BRUNNIER, OF SAN FRANCISCO, CALIFORNIA.

DOCK STRUCTURE.

1,089,745.   Specification of Letters Patent.   Patented Mar. 10, 1914.

Application filed September 18, 1913. Serial No. 790,462.

*To all whom it may concern:*

Be it known that I, HENRY J. BRUNNIER, a citizen of the United States, residing at San Francisco, in the county of San Francisco and State of California, have invented a new and useful Dock Structure, of which the following is a specification in such full and clear terms as will enable those skilled in the art to construct and use the same.

This invention relates to a dock structure and its object is to produce a resilient fender line for ships to strike against, while at the same time avoiding the use of the well known spring piles which extend from the mud line to the top of the dock, and which are largely subject to breakage and destruction due to marine insects.

It will be understood that while only a small portion of the dock has been shown it may be extended to any desired length.

An embodiment of the invention is shown in the drawing in which the same reference numeral is applied to the same portion throughout, but I am aware that there are many modifications thereof.

Figure 1 is a plan view of the terminal portion of a narrow dock, and Fig. 2 is a vertical sectional view through a portion of said dock and illustrating the position of the spring fenders.

The numeral 1 indicates the permanent dock structure which may be of concrete or stone and which is provided with a shelf-like projection at 2. Resting upon the shelf 2 at intervals are a series of wear plates 3, upon which the movable fenders slide and which support the girders free from the dock at a plurality of places. Resting upon the wear plates is a built-up girder 6, said girder having vertical sheathing timbers 7 secured thereto and which sheathing timbers also support two other lines of girders 6' and 6''.

Embedded in the concrete or stone dock structure 1 is a series of threaded plates 4, each plate having a bolt 5 threaded thereinto, said bolts extending through the respective girders to prevent them from moving more than a given distance away from the fixed dock structure.

In order to give the necessary resilient effect to the fenders, very heavy spiral springs 9 are interposed between the fixed dock structure and the fenders, said springs being of such strength as is deemed necessary to resist the shocks put upon them and being supported by the bolts 5. In order to prevent the springs from wearing the dock and girders, plates 10 are interposed between the ends of the springs and the dock and plates 11 between the ends of the springs and the respective girders. In order to prevent the sheathing from being displaced by side blows, chock blocks 8 are interposed between the several vertical sheathing members 7, those blocks adjacent the bolts 5 having holes therein to permit the fender line to move without bending the bolts.

Having thus described my invention what I claim as new and desire to secure by Letters Patent of the United States, is as follows, modifications within the scope of the claims being expressly reserved:

1. In a dock, a fixed dock structure, a girder slidable on said fixed dock structure, sheathing timbers carried by said girder and extending above the same, another girder connecting the sheathing timbers, springs interposed between the slidable girders and the fixed dock structure, and means to prevent the slidable girders from moving more than a given distance away from the dock structure.

2. In a dock, a fixed dock structure, a ledge projecting therefrom, a girder extending along said dock and resting upon said ledge, sheathing timbers carried by said girder, another girder connecting said sheathing timbers, springs interposed between the girders and the fixed dock structure, and means connecting the fixed dock structure and the movable fender line to prevent the same from moving more than a given distance away from the dock.

3. In a dock, a fixed dock structure, a supporting ledge extending therefrom, a girder on said ledge and extending along the dock structure, wear plates on said ledge and upon which said girder is slidable, sheathing timbers connected with said girder, another girder connecting the sheathing timbers, springs interposed between the girders and the fixed dock structure, and means to prevent the movable fender line from moving more than a fixed distance away from the dock structure.

4. In a dock structure, a fixed dock, a ledge extending therefrom, wear plates on said ledge, a girder resting upon said wear plates and slidable thereon, sheathing timbers connected with said girder, another girder connected with the sheathing timbers, springs interposed between the fixed dock structure and the girders, and means extending through said springs to prevent the movable fender line from moving more than a given distance away from the fixed dock structure.

5. In a dock, a fixed dock structure, a girder slidable on a plurality of supports on said fixed dock structure, sheathing timbers carried by said girder and extending above the same, another girder connecting the sheathing timbers and forming with the sheathing timbers and the other girder, a fender, and resilient means interposed between the fixed dock structure and fender to hold the girders at a given distance from the dock.

In testimony whereof I have hereunto set my hand this 12th day of August A. D. 1913, in the presence of the two subscribed witnesses.

HENRY J. BRUNNIER.

Witnesses:
C. P. GRIFFIN,
HENRY B. LESTER.

---

Copies of this patent may be obtained for five cents each, by addressing the "Commissioner of Patents, Washington, D. C."